US011498566B2

(12) United States Patent
Chen et al.

(10) Patent No.: US 11,498,566 B2
(45) Date of Patent: Nov. 15, 2022

(54) VEHICLE POWERTRAIN CONTROL SYSTEM

(71) Applicant: FORD GLOBAL TECHNOLOGIES, LLC, Dearborn, MI (US)

(72) Inventors: Fengyi Chen, Dearborn, MI (US); Yijing Zhang, Canton, MI (US); Bradley Dean Riedle, Northville, MI (US); Weitian Chen, Windsor (CA); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 16/928,707

(22) Filed: Jul. 14, 2020

(65) Prior Publication Data

US 2022/0017065 A1   Jan. 20, 2022

(51) Int. Cl.
*B60W 30/188* (2012.01)
*B60W 50/00* (2006.01)
*B60W 40/10* (2012.01)

(52) U.S. Cl.
CPC ......... *B60W 30/188* (2013.01); *B60W 40/10* (2013.01); *B60W 2050/0026* (2013.01); *B60W 2510/0208* (2013.01); *B60W 2510/0241* (2013.01); *B60W 2510/105* (2013.01); *B60W 2510/1005* (2013.01); *B60W 2520/10* (2013.01); *B60W 2520/105* (2013.01); *B60W 2520/16* (2013.01); *B60W 2540/10* (2013.01); *B60W 2552/15* (2020.02); *B60W 2710/105* (2013.01)

(58) Field of Classification Search
CPC .......... B60W 30/188; B60W 2552/15; B60W 2050/0026; B60W 2510/0208; B60W 2510/0241; B60W 2510/1005; B60W 2510/105; B60W 2520/10; B60W 2520/105; B60W 2520/16; B60W 2540/10; B60W 2710/105
See application file for complete search history.

(56) References Cited

U.S. PATENT DOCUMENTS 5,742,917 A * 4/1998 Matsuno .............. B60K 28/165
                                                      701/88
6,154,702 A    11/2000 Fodor et al.
6,640,178 B2 * 10/2003 Wakamatsu .......... B60W 10/11
                                                      477/107

(Continued)

*Primary Examiner* — Richard W Ridley
*Assistant Examiner* — Aimee Tran Nguyen
(74) *Attorney, Agent, or Firm* — Vincent Mastrogiacomo; Brooks Kushman P.C.

(57) ABSTRACT

A vehicle includes a transmission, a powerplant, an inertial measurement unit, and a controller. The transmission has an input shaft and an output shaft. The powerplant is configured to generate and deliver torque to the input shaft. The inertial measurement unit is configured to measure inertial forces exerted onto the vehicle. The controller is programmed to, in response to a demanded torque at the output shaft and a non-transient condition of the vehicle, control the torque at the output shaft based on a torque at the input shaft and a gear ratio of the step-ratio transmission. The controller is further programmed to, in response to the demanded torque at the output shaft and a transient condition of the vehicle, control the torque at the output shaft based on the inertial forces and a vehicle velocity.

20 Claims, 5 Drawing Sheets

(56) References Cited

U.S. PATENT DOCUMENTS

| | | | |
|---|---|---|---|
| 7,203,578 B2* | 4/2007 | Kuang | B60W 40/10 |
| | | | 701/22 |
| 7,920,950 B2 | 4/2011 | Nihanda | |
| 8,998,771 B2 | 4/2015 | Pietron et al. | |
| 9,258,284 B2 | 2/2016 | Tanaka | |
| 9,423,022 B2* | 8/2016 | Turner | F16H 61/0213 |
| 9,512,889 B2 | 12/2016 | Pietron et al. | |
| 9,551,415 B2 | 6/2017 | Fodor et al. | |
| 10,571,022 B2 | 2/2020 | Meyer et al. | |
| 11,209,054 B1* | 12/2021 | Zhang | F16D 48/066 |
| 2010/0222961 A1 | 9/2010 | Dlugoss | |
| 2013/0153353 A1 | 6/2013 | Teslak et al. | |
| 2014/0195082 A1* | 7/2014 | Takamura | B60L 7/14 |
| | | | 903/946 |
| 2014/0342869 A1 | 11/2014 | Maurer et al. | |
| 2015/0066264 A1 | 3/2015 | Wang et al. | |
| 2015/0274146 A1 | 10/2015 | Doering et al. | |
| 2016/0031431 A1 | 2/2016 | Johri et al. | |
| 2016/0159352 A1* | 6/2016 | Kim | B60W 30/143 |
| | | | 701/93 |
| 2018/0245692 A1 | 8/2018 | Meyer et al. | |
| 2018/0251118 A1* | 9/2018 | Gaither | B60L 7/10 |
| 2019/0176798 A1 | 6/2019 | Ford et al. | |
| 2019/0283766 A1 | 9/2019 | Jensen et al. | |
| 2020/0202057 A1 | 6/2020 | Chen et al. | |

\* cited by examiner

VEHICLE POWERTRAIN CONTROL SYSTEM

TECHNICAL FIELD

The present disclosure relates to control systems for vehicles and vehicle powertrains.

BACKGROUND

Vehicles may include power generating devices, such as an engine or an electric motor, that are configured to generate torque within a powertrain of the vehicle in order to propel the vehicle.

SUMMARY

A vehicle includes a powertrain, an inertial measurement unit, and a controller. The powertrain has a step-ratio transmission, an engine, and an electric machine. The step-ratio transmission has an input and an output. The engine is configured to generate and deliver torque to the input. The electric machine is configured to generate and deliver torque to the input. The inertial measurement unit is configured to measure inertial forces exerted onto the vehicle. The controller is programmed to, in response to a demanded torque at the output and a non-transient condition of the powertrain, control the torque at the output based on a torque at the input and a gear ratio of the step-ratio transmission. The controller is further programmed to, in response to the demanded torque at the output and a transient condition of the powertrain, control the torque at the output based on a mapped relationship between the inertial forces and a vehicle velocity, wherein the mapped relationship utilizes first, second, third, and fourth mapping parameters.

A vehicle includes a transmission, a powerplant, an inertial measurement unit, and a controller. The transmission has an input shaft and an output shaft. The powerplant is configured to generate and deliver torque to the input shaft. The inertial measurement unit is configured to measure inertial forces exerted onto the vehicle. The controller is programmed to, in response to a demanded torque at the output shaft and a non-transient condition of the vehicle, control the torque at the output shaft based on a torque at the input shaft and a gear ratio of the step-ratio transmission. The controller is further programmed to, in response to the demanded torque at the output shaft and a transient condition of the vehicle, control the torque at the output shaft based on the inertial forces and a vehicle velocity.

A vehicle includes a transmission, an engine, a disconnect clutch, an inertial measurement unit, and a controller. The transmission has an input shaft and an output shaft. The engine is configured to generate and deliver torque to the input shaft. The disconnect clutch is configured to connect and disconnect the engine from the input shaft. The inertial measurement unit is configured to measure inertial forces exerted onto the vehicle. The controller is programmed to, in response to a demanded torque at the output shaft and a non-transient condition of the vehicle, control the torque at the output shaft based on a torque at the input and a gear ratio of the step-ratio transmission. The controller is further programmed to, in response to the demanded torque at the output and a transient condition of the vehicle, control the torque at the output based on a mapped relationship between the inertial forces and a vehicle velocity, wherein the mapped relationship utilizes first, second, third, and fourth mapping parameters. The controller is further programmed to, derive the values of the first, second, third, and fourth mapping parameters based on the torque at the output, the velocity of the vehicle, and the inertial forces during non-transient conditions of the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
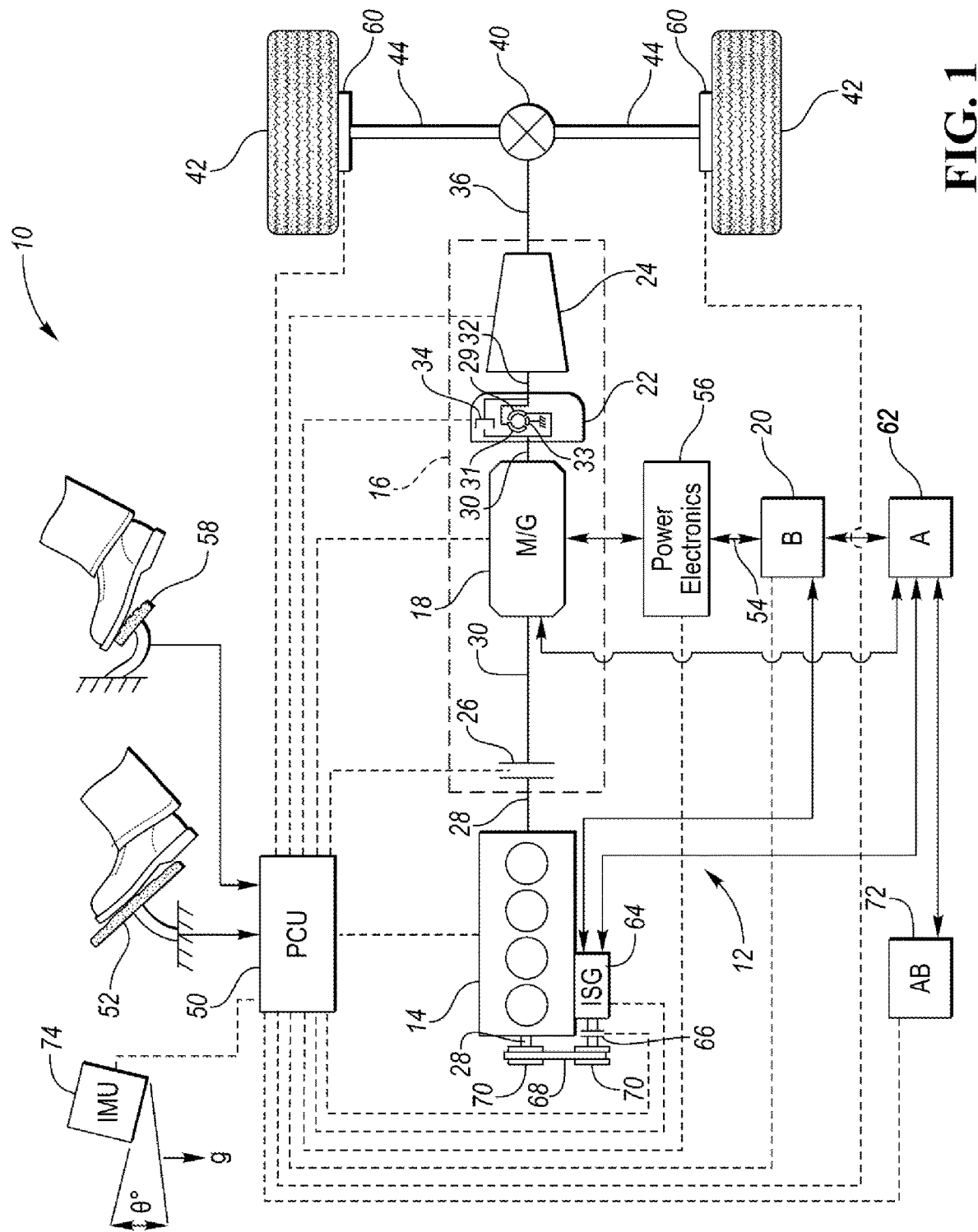
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain.

The engine 14 and the M/G 18 are both drive sources or powerplants for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller 29 fixed to M/G shaft 30, a turbine 31 fixed to a transmission input shaft 32, and a stator 33 that is grounded such that it does not rotate. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be configured to transition between an opened (or disconnected) state, a closed (or locked) state, and a slipping state. The rotation of the impeller 29 and the turbine 31 are synchronized when the torque converter bypass clutch 34 is in the closed or locked state. The rotation of the impeller 29 and the turbine 31 are non-synchronized when the torque converter bypass clutch 34 is in the open state or the slipping state The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles or half shafts 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. In another alternative embodiment, the M/G 18 may be disposed between the gearbox 24 and the differential 40. In such an alternative embodiment, where the M/G 18 is disposed between the gearbox 24 and the differential, one or more launch clutches or a torque converter may be disposed between the engine and the gearbox 24.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating the engine 14 to provide a desired torque, operating the M/G 18 to provide torque to the wheels or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine power and/or torque through the disconnect clutch 26 to the M/G 18, and then from the M/G 18 to shaft 30 (i.e., the impeller of the torque converter 22) and through the torque converter 22 and gearbox 24. The M/G 18 may assist the engine 14 by providing additional power and/or torque to turn the shaft 30 (i.e., the impeller of the torque converter 22). This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative power and/or torque to the shaft 30 (i.e., the impeller of the torque converter 22). This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an opened state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle 10 also includes an inertial measurement unit 74. The inertial measurement unit 74 is an electronic device that measures the vehicle's specific force, inertial forces acting upon the vehicle, angular rate of the vehicle, orientation of the vehicle, acceleration of the vehicle in multiple directions, attitude of the vehicle, pitch of the vehicle, etc., using a combination of accelerometers, gyroscopes, magnetometers and/or other sensors. The inertial measurement unit 74 may utilize such sensors along multiple axes to provide an estimation of the vehicle's orientation in space. The various measurements taken by the inertial measurement unit 74 may be communicated to the controller 50.

It should also be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered by an engine only, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Conventional torque estimation methods of an transmission output, which multiply the input torque to the transmission by a fixed drivetrain gear ratio or torque ratio, are accurate when the torque ratio between the input torque source and driveshaft at the output of the transmission is constant at the time of drive torque calculation. Such a condition may be referred to as a non-transient condition of the powertrain or vehicle. However, the torque ratio between the input torque source and driveshaft at the output changes continuously during drive events such as automatic shifting within the transmission, connecting or disconnecting a power source (e.g., an engine) to or from the input to the transmission via clutch, a slipping condition of such a clutch that connects and disconnects such a power source to or from the input to the transmission, or any other similar condition, all of which may be referred to as a transient condition of the powertrain or vehicle. Conventional drive torque estimation methods, which are based on the estimated drivetrain input torque multiplied by a fixed drivetrain gear ratio or torque ratio, may be inaccurate when the torque ratio between the input torque source and driveshaft is not known precisely at the time of drive torque calculation (i.e., the torque calculation at the output of the transmission).

Methods for determining the output torque of a transmission based on the changing torque ratio between the input torque source and driveshaft at the output of the transmission during a transient condition require a priori knowledge of model parameters (e.g., vehicle mass, shaft stiffness, tire radius, vehicle pitch angle drive resistance, road grade, and other road conditions) in order to accurately estimate the drive torque at the output of the transmission. However, such model parameters may not always be accurately estimated. For example, shaft stiffness and tire radius may be difficult to determine accurately due to specific customer usage, manufacturing variability, and property changes in the shaft stiffness and tire radius over the life of vehicle; vehicle mass may be difficult to determine accurately because vehicle mass depends on specific usage of vehicle (e.g., the overall mass of a vehicle may change as the cargo load and/or number passengers changes); road grade and drive resistance may be difficult to determine accurately because the road grade and drive resistance may change depending on the properties of the road surface (e.g., coefficient of friction, slope of the road, etc.) that the vehicle is traveling on; vehicle pitch may be difficult to determine accurately because vehicle pitch is constantly changing during a drive cycle (e.g., the pitch changes during acceleration and braking of the vehicle); etc.

This disclosure includes a method of estimating the drive torque (e.g., the output torque of a vehicle transmission or the torque at the drive axle of a vehicle) based on an algebraic mapping of an inertial measurement unit (IMU) signal in order to control or drive the drive torque towards a desired value in vehicular propulsion systems. The drive torque, $T_D$, may be defined as torque delivered to the transmission output shaft (e.g., output shaft 36) or to the driveshaft of a drivetrain system. It may also be interpreted as torque delivered to the drive axle (e.g., the axle that includes half shafts 44, differential 40, and drive wheels 42). The inertial measurement unit 74 may output a signal, $a_{imu}$, representative of the inertial forces acting on the vehicle 10 in the longitudinal direction of vehicle motion (i.e., the direction from the front to the rear of the vehicle). The IMU signal, $a_{imu}$, differs from a vehicle acceleration in the longitudinal direction of vehicle motion, $a_{long}$, except when the vehicle is moving straight on a flat ground at zero grade and zero vehicle pitch angle. The IMU signal, $a_{imu}$, takes into account the road grade, the vehicle pitch angle, the longitudinal vehicle acceleration, $a_{long}$, and the angle of the inertial measurement unit 74 with respect to the horizontal (i.e., a plane that is perpendicular to the direction of gravity). A vehicle speed measurement, $v$, may also be measured via a sensor.

A four-parameter mapping formula, the IMU signal, $a_{imu}$, and the vehicle speed, $v$, may be utilized to derive drive torque, $T_D$. The four-parameter mapping formula includes mapping parameters $k_1$, $k_2$, $k_3$, and $k_4$, and provides a means to algebraically map the IMU signal, $a_{imu}$, and the vehicle speed, $v$, to drive torque, $T_D$. The four-parameter mapping equation is derived from the first principle of vehicle motion that represents the effects of vehicle mass, $M_v$, road grade, $\theta_{gr}$, drive resistance, vehicle pitch, $\theta_p$, and the mounting angle of the IMU with respect to the horizontal, $\theta_0$. However, the original model parameters within the equation of motion are uniquely lumped into the four mapping parameters $k_1$, $k_2$, $k_3$, and $k_4$, such that each of the mapping parameter remains approximately constant under all drive conditions, enabling the identification of the four mapping parameters $k_1$, $k_2$, $k_3$, and $k_4$, without relying on the physical properties of the vehicle unlike prior methods. Accordingly, no prior knowledge of vehicle attributes, drive conditions, and measurements, except the IMU signal, $a_{imu}$, and vehicle speed, $v$, are required to determine 4 mapping parameters $k_1$, $k_2$, $k_3$, and $k_4$.

Prior methods require a priori knowledge and/or simultaneous identification of vehicle attributes, such as vehicle mass and drive conditions (e.g., road grade) to determine model parameters for estimating drive torque. The four-parameter mapping method in this disclosure provides a means to algebraically map the IMU signal, $a_{imu}$, and the vehicle speed, $v$, to drive torque, $T_D$, without requiring the knowledge of vehicle attributes, such as vehicle mass and drive conditions (e.g., road grade). The four mapping parameters $k_1$, $k_2$, $k_3$, and $k_4$, are algebraically determined or derived based on the IMU measurement signal, $a_{imu}$, vehicle speed, $v$, and a reference drive torque, $T_D^{ref}$, under certain pre-specified drive conditions. Such certain pre-specified drive conditions may be referred to as non-transient conditions.

The reference drive torque, $T_D^{ref}$, is an estimate of drive torque at the output of a transmission (e.g., shaft 36) based on an estimated drivetrain input torque, $T_{in}$ (e.g., the torque at the input to the transmission, which may be the input torque to the torque converter 22 or the input torque to the transmission gearbox 24 in powertrain systems that do not have a torque converter), such as an engine torque, $T_e$, an electric machine torque, $T_m$, or the combined effect of engine torque, $T_e$, and electric machine torque, $T_m$, multiplied by a fixed torque ratio, $R_t$, of the drivetrain system or multiplied by the inverse of the gear ratio, $R_g$, between the input (e.g., shaft 30 or shaft 32 in powertrain systems that do not have a torque converter) and the output of the transmission (e.g., shaft 36) at the time of the calculation. The presence of a torque converter in the drivetrain system may be accounted for when determining reference drive torque, $T_D^{ref}$, using a torque converter model that may be empirically determined.

The controller 50 determines the drivetrain input torque, $T_{in}$, based on the control conditions of the engine 14 and M/G 18, such as the air-to-fuel ratio of the engine, throttle position, spark ignition timing and electric current to M/G 18. The input torque, $T_{in}$, is generally accurate when the power generating components are running within the normal operating conditions without abrupt changes to the controlled states, where the variables, such as the air-to-fuel ratio of the engine, throttle position, spark ignition timing and electric current to M/G 18, are determined accurately. For example, the input torque is considered accurate during a normal vehicle launch sequence with no abrupt modulation of accelerator pedal with no significant retardation of engine spark ignition timing. The input torque, $T_{in}$, may become inaccurate when the power generating components are in transient states associated with certain control actions such as a rapid depression of accelerator pedal.

The reference drive torque, $T_D^{ref}$, may only be accurate when the estimate of input torque to the transmission, $T_{in}$, is accurate and when the vehicle 10 or vehicle powertrain 12 are operating under non-transient conditions. A non-transient condition may include operation of the drivetrain or powertrain 12 in a fixed gear position/fixed gear ratio where no shifting within the gearbox 24 is occurring; the engine disconnect clutch 26 being fully engaged or fully disengaged (i.e., the engine disconnect clutch 26 being in a non-slipping condition); and when the drivetrain or powertrain 12 is operating with no abrupt transient behaviors, such as a lash crossing, which may dynamically alter the way torque is transmitted through the drivetrain or powertrain.

The reference drive torque, $T_D^{ref}$, may differ from actual drive torque and may become inaccurate under drive conditions when the estimate of input torque, $T_{in}$, is known to be inaccurate. This may occur for example, when the engine 14 is turning without firing cylinders, when the engine 14 has not established steady combustion after ignition, when the engine 14 is running under a heavily retarded spark ignition condition, when the engine 14 is running at unsteady air-to-fuel ratio, when the M/G 18 speed is rapidly changing, and/or when the vehicle 10 or powertrain 12 are operating under transient conditions. A transient condition may include operation of the drivetrain or powertrain 12 during a gear-shift within the gearbox 24 where the torque ratio varies, when engine disconnect clutch 26 is in a state of partial engagement (i.e., a slipping state), or when the drivetrain or powertrain 12 is operating during abrupt transient behaviors, such as a lash crossing.

A recursive least square method (RLS) or Kalman Filtering method may be utilized to adaptively identify and refine four-mapping parameters, $k_1$, $k_2$, $k_3$, and $k_4$, under the drive conditions when the reference drive torque, $T_D^{ref}$, is known to be accurate (i.e., when the estimate of input torque, $T_{in}$, is known to be accurate and when the vehicle 10 or powertrain 12 are operating under non-transient conditions), and when the IMU signal, $a_{imu}$, and vehicle speed measurement, v, are available. This process may be referred to as selective learning of the mapping parameters.

Since the mapping parameters, $k_1$, $k_2$, $k_3$, and $k_4$, are designed to be approximately constant under all drive conditions, the mapping parameters, $k_1$, $k_2$, $k_3$, and $k_4$, may be accurately determined from selective drive conditions where reference drive torque, $T_D^{ref}$, is known to be accurate. The four-parameter mapping equation that includes the learned mapping parameters, $k_1$, $k_2$, $k_3$, and $k_4$, may then be utilized to predict drive torque, $T_D$, accurately based on the IMU signal, $a_{imu}$, and the vehicle speed, v, without requiring any additional knowledge during drive conditions when reference drive torque, $T_D^{ref}$, is not available (e.g., during a condition when the estimate of input torque, $T_{in}$, is known to be inaccurate and/or when the vehicle 10 or powertrain 12 are operating under transient conditions). The four-parameter mapping formula accounts for the effects of mass, grade, drive resistance, vehicle pitch, IMU instrumentation position, etc. without requiring prior knowledge of such variables or factors in predicting drive torque, $T_D$.

The four-parameter mapping formula may be derived via the following method:

First a longitudinal equation of motion of the vehicle under a no-braking and no-steering condition is derived from equation (1):

$$M_v a_{long} = T_D \frac{i_{FDR}}{r_{tire}} - (C_1 + C_2 v + C_3 v^2) - C_0 C_D A v^2 - M_v g \sin\theta_{gr} \quad (1)$$

where $T_D$, is the drive torque at the output of the transmission gearbox 24, $a_{long}$ is the longitudinal vehicle acceleration of the vehicle, $M_v$ is the vehicle mass, $i_{FDR}$ is the final drive ratio between the axle shaft 44 and the output of the transmission 36 (which may or may not include a torque converter), $r_{tire}$ is the tire radius of one or more wheels 42, g is the acceleration due to gravity, $\theta_{gr}$ is the road grade, A is the effective cross section of the vehicle, and $C_0$, $C_1$, $C_2$, $C_3$, and $C_D$ are model constants that are identified empirically from specially designed vehicle tests. $C_1+C_2v+C_3v^2$ may more specifically represent the road load, $C_0 C_D A v^2$ may more specifically represent the air drag acting on the vehicle, and $M_v g \sin\theta_{gr}$ may more specifically represent the effect of the road grade on the vehicle.

Next, the IMU signal, $a_{imu}$, is derived from equation (2):

$$a_{imu}=a_{long}\cos(\theta_p+\theta_0)+g\sin(\theta_{gr}+\theta_p+\theta_0)\approx a_{long}+g\sin\theta_{gr}+g(\theta_p+\sin\theta_0)\cos\theta_{gr} \quad (2)$$

where $a_{imu}$ is the IMU signal, $a_{long}$ is the longitudinal vehicle acceleration of the vehicle, $\theta_p$ is the vehicle pitch angle, $\theta_0$ is the angle of the inertial measurement unit 74 with respect to the horizontal (i.e., a plane that is perpendicular to the direction of gravity), g is the acceleration due to gravity, and $\theta_{gr}$ is the road grade.

The angle of the inertial measurement unit, $\theta_0$, is generally fixed with respect to the vehicle frame, but it may vary if the vehicle is unevenly loaded or due to tire pressure conditions. The angle of the inertial measurement unit, $\theta_0$, may also vary from vehicle to vehicle due to variation in installation of the inertial measurement unit 74. The vehicle pitch angle, $\theta_p$, may change often depending on drive conditions (e.g., the vehicle pitch angle, $\theta_p$, is going to change during acceleration and braking maneuvers). The road grade, $\theta_{gr}$, may also change often as the drive environment (i.e., the slope or grade of the surface the vehicle is traveling) changes.

Equations (1) and (2) then may be combined into equation (3) in order to determine the mapping parameters, $k_1$, $k_2$, $k_3$, and $k_4$:

$$T_D = k_1 + k_2 a_{imu} + k_3 v + k_4 v^2 \text{ where} \quad (3)$$

$$k_1 = \frac{r_{tire}}{i_{FDR}} C_1 - \frac{M_v r_{tire}}{i_{FDR}}(\theta_p + \sin\theta_0)g\cos\theta_{gr},$$

$$k_2 = \frac{M_v r_{tire}}{i_{FDR}}, k_3 = \frac{r_{tire}}{i_{FDR}} C_2, \text{ and } k_4 = \frac{r_{tire}}{i_{FDR}}(C_3 + C_0 * C_D A).$$

Equation (3) enables an algebraic mapping of the IMU signal, $a_{imu}$, into the drive torque at the output of the transmission, $T_D$, while accounting for mass, loss, grade, pitch, and the position of the inertial measurement unit 74. The mapping parameters, $k_1$, $k_2$, $k_3$, and $k_4$, are defined in such a way that they remain approximately constant under most drive conditions. For example, $k_1$ consists of two terms; the second term contains $\theta_p$, $\theta_0$ and $\theta_{gr}$, where $\theta_0$ is typically less than 2 degrees and considered constant, $\theta_p$ may vary up to 2 degrees under typical drive conditions, $\theta_{gr}$ may vary up to 10 degrees, but its cosine value remains approximately 1. Accordingly, the second term of $k_1$ becomes insignificant as compared to the first term. Therefore, the values of $k_1$ are dominated by the first term, making it approximately constant during a given drive cycle. The other mapping parameters, $k_2$, $k_3$, and $k_4$, also remain approximately constant during a drive cycle. The mapping parameters, $k_1$, $k_2$, $k_3$, and $k_4$, are determined during targeted drive conditions (e.g., the non-transient conditions referenced earlier) when a reference drive torque at the input to the transmission is accurately available. The mapping parameters can be adaptively improved using an RLS method or Kalman filtering when reference drive torque at the input to the transmission is accurately available during select drive conditions. The mapping parameters are adaptively determined and improved for each vehicle, accounting for varying customer use such as loading conditions, property change due to aging of hardware, and unit-to-unit manufacturing variation. The mapping formula may be utilized to predict the drive torque at the output of the transmission, $T_D$, under a broad range drive conditions (e.g., the transient conditions referenced earlier) once the mapping parameters, $k_1$, $k_2$, $k_3$, and $k_4$, are determined.

Figure 2:
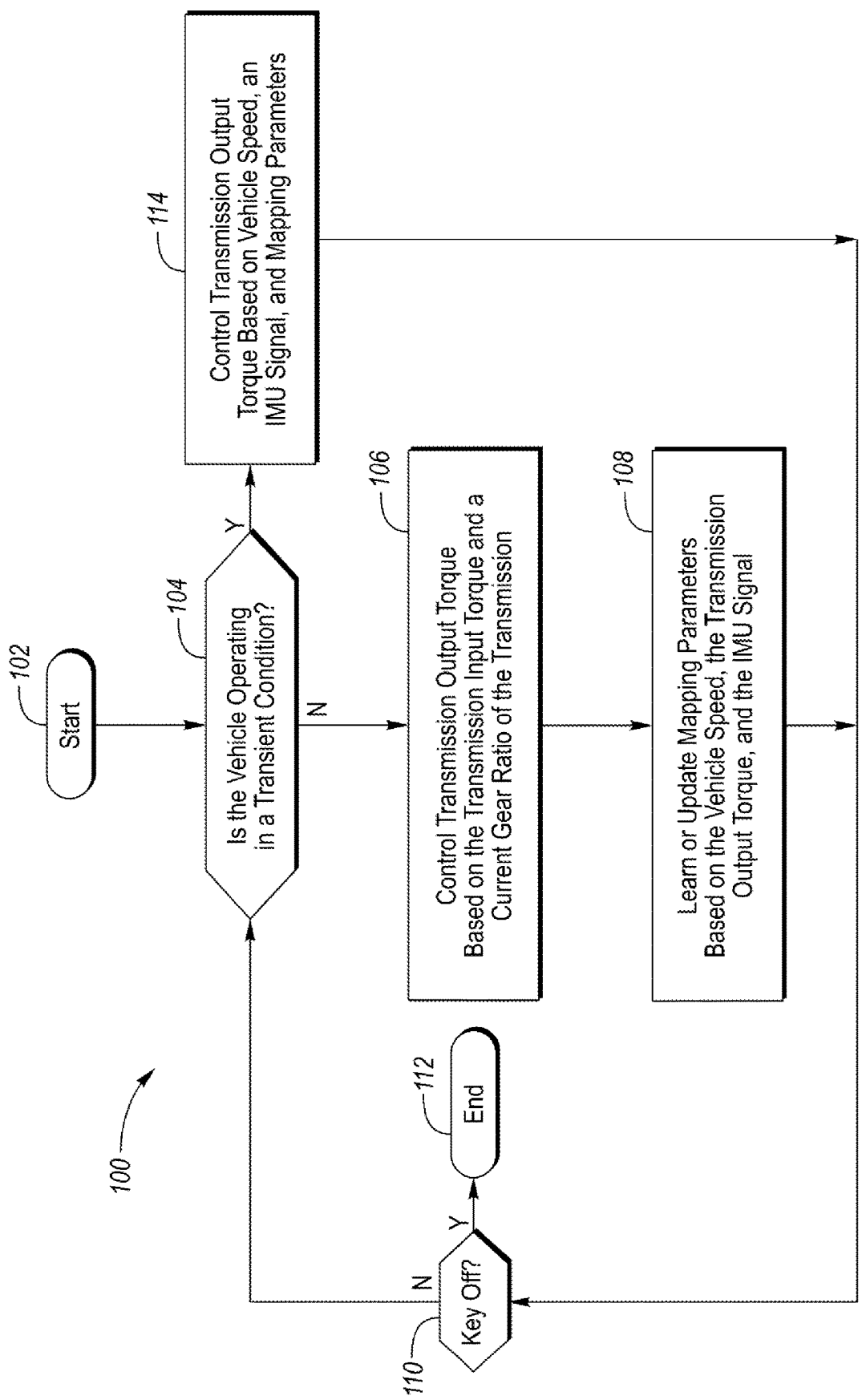
FIG. 2 is a flowchart illustrating a method of controlling the output torque of a vehicle transmission.

Referring to FIG. 2, a flowchart of a method 100 of controlling the output torque of a vehicle transmission (i.e., drive torque, $T_D$) is illustrated. The method 100 may be stored as control logic and/or an algorithm within the controller 50 or in cloud computing storage. The controller 50 may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle.

The method 100 then moves on to block 104, where it is determined if the vehicle is operating in a transient condition (e.g., any of the transient conditions referenced earlier). If the vehicle is not operating in a transient condition (i.e., if the vehicle is operating in any of the non-transient conditions referenced earlier), the method 100 moves on to block 106. At block 106, the torque at the output of the transmission is controlled to a value that corresponds to the reference drive torque, $T_D^{ref}$, which is based on multiplying the input torque to the transmission, $T_{in}$, by the fixed torque ratio, $R_t$, of the drivetrain system or by multiplying the input torque to the transmission, $T_{in}$, by the inverse of the gear ratio, $R_g$, of the transmission.

Next, the method 100 moves on to block 108 where the mapping parameters, $k_1$, $k_2$, $k_3$, and $k_4$, are learned or updated during the non-transient condition based on the vehicle speed, v, the reference drive torque, $T_D^{ref}$, and the IMU signal, $a_{imu}$. More specifically, the vehicle speed, v, the reference drive torque, $T_D^{ref}$, and the IMU signal, $a_{imu}$, and are mapped into the four-parameter mapping equation (i.e., equation 3) using an RLS method or a Kalman filtering method at block 108 to either derive or update the mapping parameters, $k_1$, $k_2$, $k_3$, and $k_4$. The mapping parameters, $k_1$, $k_2$, $k_3$, and $k_4$, may experience little or no changes once large amounts of data is collected or if the data collected is within an allowable variance of the current values. If new data is an outlier and varies significantly from other data points, such new data may be ignored and the mapping parameter would not be adjusted by such data. Furthermore, the mapping parameters, $k_1$, $k_2$, $k_3$, and $k_4$, may have had initial values that were stored in the controller 50 after the previous occurrence that the method 100 cycled through block 108 or at the end of a previous drive cycle. If the mapping parameters, $k_1$, $k_2$, $k_3$, and $k_4$, are updated at block 108, the new values of the mapping parameters, $k_1$, $k_2$, $k_3$, and $k_4$, are stored within the controller 50 and may replace the previous values of the mapping parameters, $k_1$, $k_2$, $k_3$, and $k_4$.

Next, the method 100 moves on to block 110 where it is determined if the vehicle ignition has been disengaged, which corresponds to a "key off" condition that indicates the operator has turned off the vehicle and has terminated the current drive cycle. If the vehicle ignition has been disengaged, the method 100 ends at block 112. If the vehicle ignition has not been disengaged, the method 100 returns to block 104, where the process repeats.

Returning to block 104, if it was determined that the vehicle was operating in a transient condition (e.g., any of the transient conditions referenced earlier), the method 100 moves on to block 114. At block 114, the torque at the output of the transmission, $T_D$, is controlled to a value based on the vehicle speed, v, the IMU signal, $a_{imu}$, and the mapping parameters, $k_1$, $k_2$, $k_3$, and $k_4$, utilizing equation (3). The current values of the mapping parameters, $k_1$, $k_2$, $k_3$, and $k_4$, may be based on the value stored in the controller 50 after the previous occurrence that the method 100 cycled through block 108 or at the end of a previous drive cycle. The method 100 moves on to block 110. It should be understood that the flowchart in FIG. 2 is for illustrative purposes only and that the method 100 should not be construed as limited to the flowchart in FIG. 2. Some of the steps of the method 100 may be rearranged while others may be omitted entirely.

Figure 3:
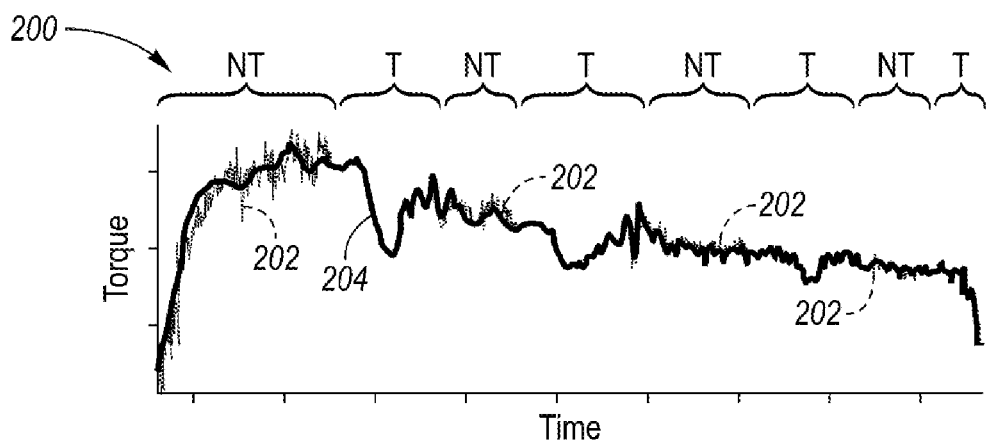
FIG. 3 is a series of graphs illustrating the selective learning utilized to learn or update the mapping parameters.
Figure 3:
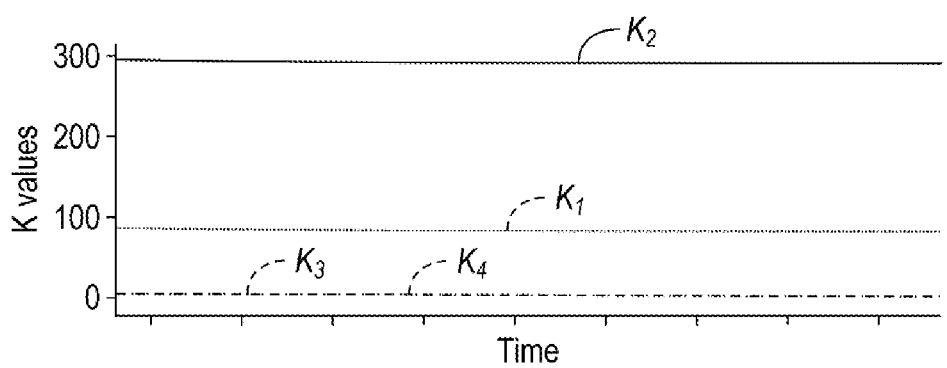

Referring to FIG. 3, a series of graphs 200 demonstrating the selective learning utilized to learn or update the mapping parameters $k_1$, $k_2$, $k_3$, and $k_4$ is illustrated. The data represents several minutes of mixed city and highway driving with variations in the road grade. Broken line 202 presents the reference drive torque, $T_D^{ref}$, at the output of the transmission while line 204 represents the predicted torque values at the output of the transmission, $T_D$, according to equation (3). The learning conditions included: $T_D^{ref} > 10$ Nm, $a_{long} > 0.1$ m/s$^2$, no braking, steering angle <5°, drive shaft speed >25 rpm (i.e., the speed of shaft 36), no engine restart event, no engine disconnect event, and no gear shifting in the gearbox 24. The Mapping parameters $k_1$, $k_2$, $k_3$, and $k_4$ are initially identified within a few seconds and adaptively adjusted throughout the drive cycle. The Mapping parameters remain stable throughout the drive cycle. The predicted torque values at the output of the transmission, $T_D$, track the reference drive torque, $T_D^{ref}$, closely when the reference drive torque, $T_D^{ref}$, is available during learning conditions (i.e., non-transient conditions, denoted "NT" in FIG. 3). The predicted torque values at the output of the transmission, $T_D$, provide an accurate torque value for controlling the output torque of the gearbox 24 when the reference drive torque, $T_D^{ref}$ is not available during transient conditions, denoted "T" in FIG. 3.

Figure 4:
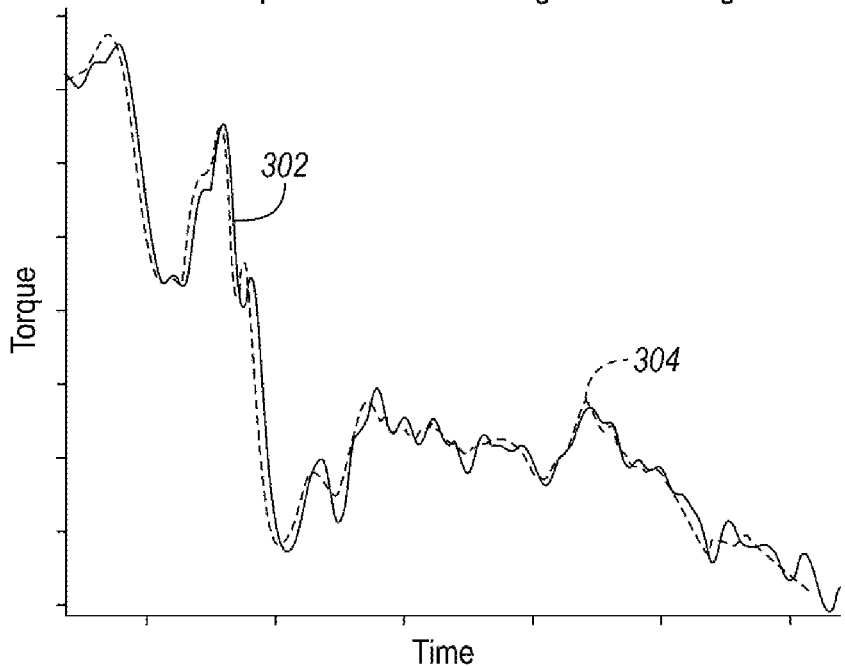
FIG. 4 is a series of graphs illustrating the predictive performance of the output torque of the vehicle transmission during shift sequence of the transmission.

Referring to FIG. 4 is a series of graphs 300 illustrating the predictive performance of the output torque of the vehicle transmission, $T_D$, during a transient condition, specifically a shift sequence of the transmission 24 while no braking and no steering of the vehicle are occurring, is illustrated. Line 302 represents the predicted torque values at the output of the transmission, $T_D$, during the shift sequence according to equation (3), while line 304 represents an actual torque of the transmission output shaft (e.g., shaft 36) that was measured during testing where the vehicle was equipped with a torque sensor. The graphs in FIG. 4 illustrate the robustness of the accuracy of the predicted torque values at the output of the transmission, $T_D$, which have minimal variation from the measured torque during the testing operation.

Figure 5:
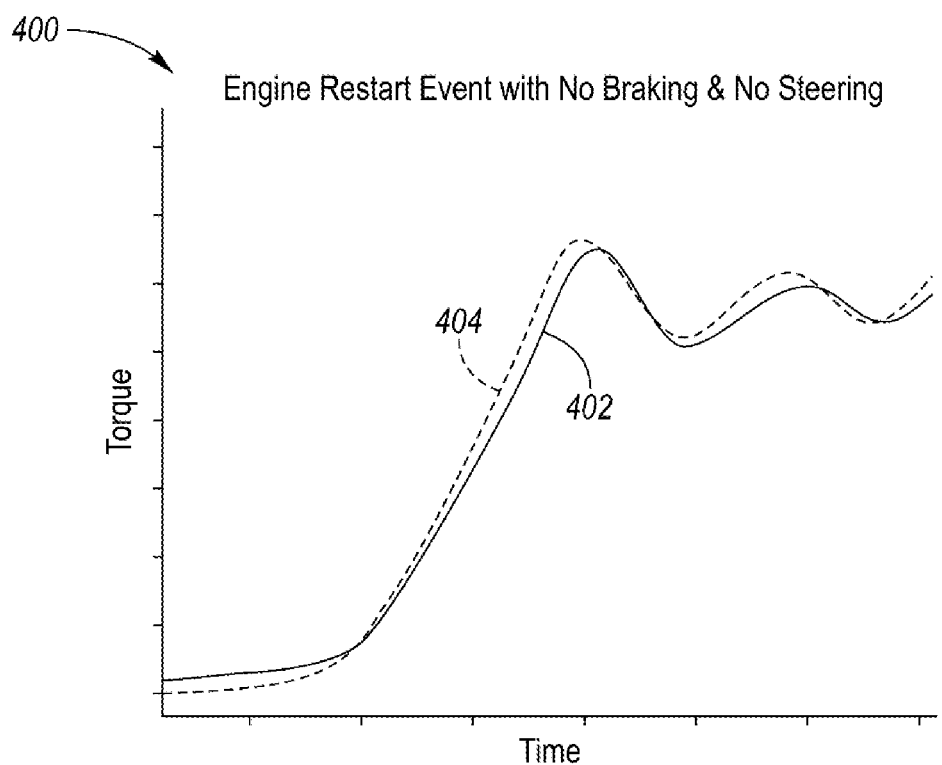
FIG. 5 is a series of graphs illustrating the predictive performance of the output torque of the vehicle transmission during an engine restart.

Referring to FIG. 5 is a series of graphs 400 illustrating the predictive performance of the output torque of the vehicle transmission, $T_D$, during a transient condition, specifically a starting sequence of the engine 14 while no braking and no steering of the vehicle are occurring, is illustrated. Line 402 represents the predicted torque values at the output of the transmission, $T_D$, during the engine start according to equation (3), while line 404 represents an actual torque of the transmission output shaft (e.g., shaft 36) that was measured during testing where the vehicle was equipped with a torque sensor. The graphs in FIG. 5 further illustrate the robustness of the accuracy of the predicted torque values at the output of the transmission, $T_D$, which have minimal variation from the measured torque during the testing operation.

Figure 6:
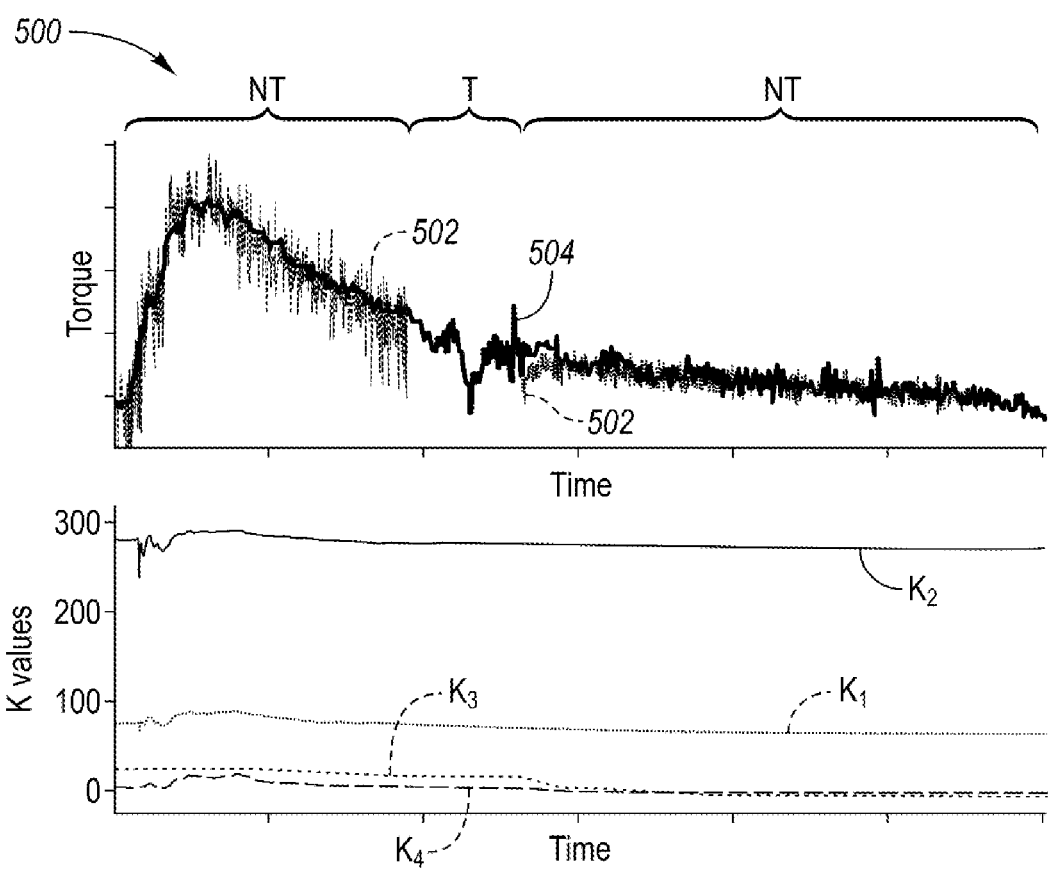
FIG. 6 is a series of graphs illustrating the learning of the mapping parameters during a launch sequence after an increase in the mass of the vehicle.

Referring to FIG. 6, a series of graphs 500 demonstrating the selective learning utilized to learn or update the mapping parameters $k_1$, $k_2$, $k_3$, and $k_4$ is illustrated. The data was collected during a launch sequence of the vehicle with an additional 1000 lb of weight added to the vehicle. Broken line 502 presents the reference drive torque, $T_D^{ref}$, at the output of the transmission while line 504 represents the predicted torque values at the output of the transmission, $T_D$, according to equation (3). The Mapping parameters $k_1$, $k_2$, $k_3$, and $k_4$ are initially identified within a few seconds of the initial vehicle launch when the reference torque, $T_D^{ref}$, is available and are adaptively adjusted throughout drive cycle without the controller 50 being explicitly programmed to adjust to account for the 1000 lb of added weight. The Mapping parameters remain stable throughout the drive cycle. The predicted torque values at the output of the transmission, $T_D$, track the reference drive torque, $T_D^{ref}$, closely when the reference drive torque, $T_D^{ref}$, is available during learning conditions (i.e., non-transient conditions, denoted "NT" in FIG. 6). The predicted torque values at the output of the transmission, $T_D$, provide an accurate torque value for controlling the output of the gearbox 24 when the reference drive torque, $T_D^{ref}$ is not available during transient conditions, denoted "T" in FIG. 6.

Figure 7:
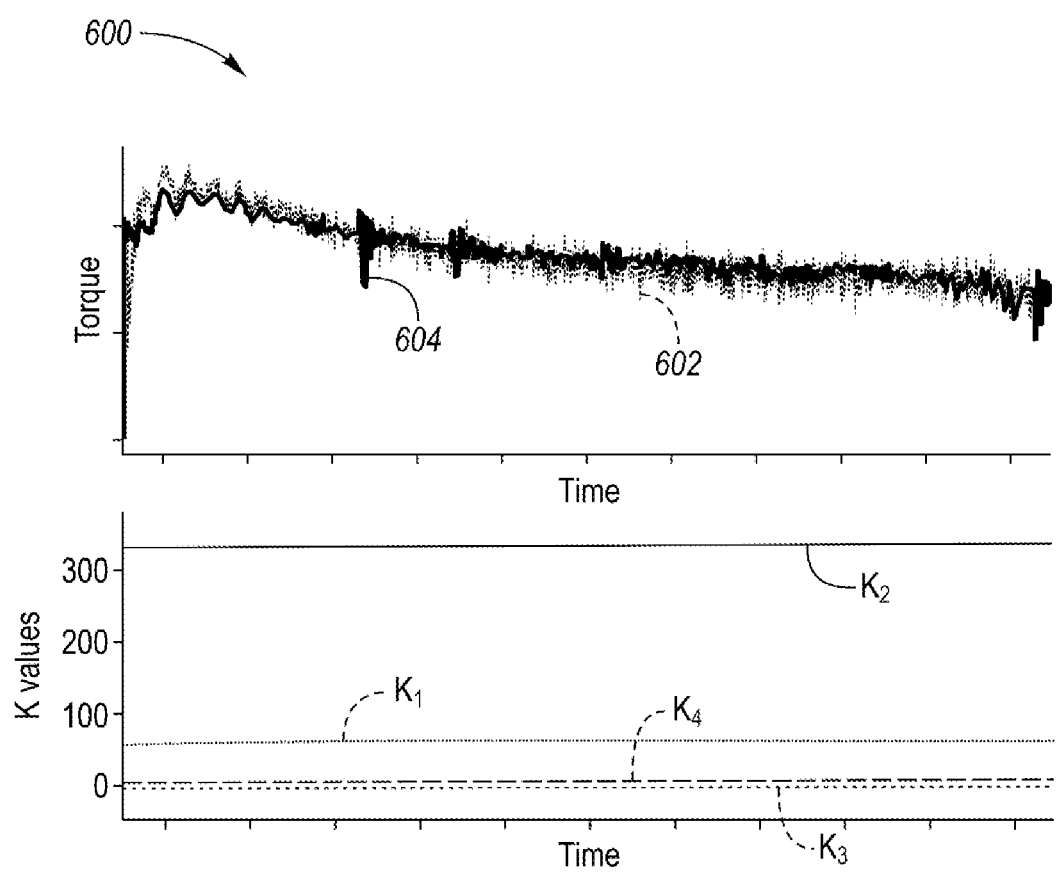
FIG. 7 is a series of graphs illustrating the learning of the mapping parameters during a launch sequence on non-zero road grade.

Referring to FIG. 7, a series of graphs 600 demonstrating the selective learning utilized to learn or update the mapping parameters $k_1$, $k_2$, $k_3$, and $k_4$ is illustrated. The data was collected during a launch sequence of the on a non-zero road grade. Specifically, the vehicle was driven up an 10% grade and down a 20% grade. Line 602 presents the reference drive torque, $T_D^{ref}$, at the output of the transmission while line 604 represents the predicted torque values at the output of the transmission, $T_D$, according to equation (3). The Mapping parameters $k_1$, $k_2$, $k_3$, and $k_4$ remain constant during the event depicted in FIG. 7, even as the road grade changes. The predicted torque values at the output of the transmission, $T_D$, track the reference drive torque, $T_D^{ref}$, closely throughout the event depicted in FIG. 7. The graphs in FIG. 7 illustrate the robustness of the accuracy of the predicted torque values at the output of the transmission, $T_D$, which track the reference drive torque, $T_D^{ref}$, under changing road grade conditions without prior knowledge of the change in road grade being known.

The following application is related to the present application: U.S. Pat. Appl. Ser. No. 16/928,715, filed on Jul. 14, 2020, which is incorporated by reference herein in its entirety.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a powertrain having,
        a step-ratio transmission having an input and an output,
        an engine configured to generate and deliver torque to the input, and
        an electric machine configured to generate and deliver torque to the input,
    an inertial measurement unit configured to measure inertial forces exerted onto the vehicle; and
    a controller programmed to,
        in response to a demanded torque at the output and a non-transient condition of the powertrain, control the torque at the output based on a torque at the input and a gear ratio of the step-ratio transmission, and
        in response to the demanded torque at the output and a transient condition of the powertrain, control the torque at the output based on a mapped relationship between the inertial forces and a vehicle velocity, wherein the mapped relationship utilizes first, second, third, and fourth mapping parameters.

2. The vehicle of claim 1, wherein the controller is configured to derive values of the first, second, third, and fourth mapping parameters during non-transient conditions of the powertrain based on the torque at the output, the velocity of the vehicle, and the measured inertial forces.

3. The vehicle of claim 2, wherein the controller is configured to derive the values of the first, second, third, and fourth mapping parameters utilizing a Kalman filter.

4. The vehicle of claim 2, wherein the controller is configured to derive the values of the first, second, third, and fourth mapping parameters utilizing a recursive least square method.

5. The vehicle of claim 1, wherein the inertial forces are based on a longitudinal acceleration of the vehicle, a road grade, and a pitch angle of the vehicle.

6. The vehicle of claim 1, wherein the non-transient condition is a fixed gear ratio within the step-ratio transmission.

7. The vehicle of claim 1, wherein the transient condition is a gear ratio shift within the step-ratio transmission.

8. The vehicle of claim 1, wherein the transient condition is a lash-crossing within the powertrain.

9. The vehicle of claim 1 further comprising an engine disconnect clutch, and wherein the non-transient condition is a locked condition of the engine disconnect clutch.

10. The vehicle of claim 1 further comprising an engine disconnect clutch, and wherein the non-transient condition is an open condition of the engine disconnect clutch.

11. The vehicle of claim 1 further comprising an engine disconnect clutch, and wherein the transient condition is a slipping condition of the engine disconnect clutch.

12. A vehicle comprising:
    a transmission having an input shaft and an output shaft;
    a powerplant configured to generate and deliver torque to the input shaft;
    an inertial measurement unit configured to measure inertial forces exerted onto the vehicle; and
    a controller programmed to,
        in response to a demanded torque at the output shaft and a non-transient condition of the vehicle, control the torque at the output shaft based on a torque at the input shaft and a gear ratio of the transmission, and
        in response to the demanded torque at the output shaft and a transient condition of the vehicle, control the torque at the output shaft based on the inertial forces and a vehicle velocity.

13. The vehicle of claim 12, wherein the controller is programmed to, in response to the demanded torque at the output shaft and the transient condition of the vehicle, control the torque at the output shaft based on a mapped relationship between the inertial forces and the vehicle velocity that utilizes first, second, third, and fourth mapping parameters.

14. The vehicle of claim 13, wherein the controller is configured to derive values of the first, second, third, and fourth mapping parameters during non-transient conditions of the powertrain based on the torque at the output shaft, the velocity of the vehicle, and the inertial forces.

15. The vehicle of claim 14, wherein the controller is configured to derive the values of the first, second, third, and fourth mapping parameters utilizing a Kalman filter.

16. The vehicle of claim 14, wherein the controller is configured to derive the values of the first, second, third, and fourth mapping parameters utilizing a recursive least square method.

17. A vehicle comprising:
a transmission having an input shaft and an output shaft;
an engine configured to generate and deliver torque to the input shaft;
a disconnect clutch configured to connect and disconnect the engine from the input shaft;
an inertial measurement unit configured to measure inertial forces exerted onto the vehicle; and
a controller programmed to,
  in response to a demanded torque at the output shaft and a non-transient condition of the vehicle, control the torque at the output shaft based on a torque at the input and a gear ratio of the transmission,
  in response to the demanded torque at the output and a transient condition of the vehicle, control the torque at the output based on a mapped relationship between the inertial forces and a vehicle velocity, wherein the mapped relationship utilizes first, second, third, and fourth mapping parameters, and
  derive the values of the first, second, third, and fourth mapping parameters based on the torque at the output, the velocity of the vehicle, and the inertial forces during non-transient conditions of the vehicle.

18. The vehicle of claim 17, wherein the non-transient condition is a locked condition of the engine disconnect clutch.

19. The vehicle of claim 17, wherein the non-transient condition is an open condition of the engine disconnect clutch.

20. The vehicle of claim 17, wherein the transient condition is a slipping condition of the engine disconnect clutch.

\* \* \* \* \*